US012093633B1

(12) United States Patent
Cai et al.

(10) Patent No.: US 12,093,633 B1
(45) Date of Patent: Sep. 17, 2024

(54) METHOD FOR EXTRACTING PARASITIC CAPACITANCE OF INTERCONNECTION LINES OF INTEGRATED CIRCUIT BASED ON DISCONTINUOUS GALERKIN FINITE ELEMENT METHOD (71) Applicants: Nanjing University Of Posts And Telecommunications, Jiangsu (CN); NANTONG INSTITUTE OF NANJING UNIVERSITY OF POSTS AND TELECOMMUNICATIONS CO., LTD., Jiangsu (CN)

(72) Inventors: Zhikuang Cai, Jiangsu (CN); Hang Yang, Jiangsu (CN); Zhenghao Zhao, Jiangsu (CN); Hongqiang Zhu, Jiangsu (CN); Henglu Wang, Jiangsu (CN); Jingjing Guo, Jiangsu (CN); Jiafei Yao, Jiangsu (CN); Yufeng Guo, Jiangsu (CN)

(73) Assignees: Nanjing University Of Posts And Telecommunications, Jiangsu (CN); NANTONG INSTITUTE OF NANJING UNIVERSITY OF POSTS AND TELECOMMUNICATIONS CO., LTD., Jiangsu (CN)

( * ) Notice: Subject to any disclaimer, the term of this patent is extended or adjusted under 35 U.S.C. 154(b) by 0 days.

(21) Appl. No.: 18/022,272

(22) PCT Filed: May 27, 2022

(86) PCT No.: PCT/CN2022/095540
§ 371 (c)(1),
(2) Date: Feb. 21, 2023

(87) PCT Pub. No.: WO2023/173592
PCT Pub. Date: Sep. 21, 2023

(30) Foreign Application Priority Data

Mar. 17, 2022 (CN) .......................... 202210263251.3

(51) Int. Cl.
G06F 30/39 (2020.01)
G06F 17/12 (2006.01)
(Continued)

(52) U.S. Cl.
CPC ............ *G06F 30/398* (2020.01); *G06F 17/12* (2013.01); *G06F 30/392* (2020.01); *G06F 2111/10* (2020.01)

(58) Field of Classification Search
CPC ...... G06F 30/398; G06F 17/12; G06F 30/392; G06F 2111/10; G06F 30/23; G06F 30/30;
(Continued)

(56) References Cited

U.S. PATENT DOCUMENTS

| 2010/0205572 | A1* | 8/2010 | Dai ........................ G06F 30/23 716/120 |
| 2012/0074233 | A1 | 3/2012 | Finn et al. |
| 2014/0173542 | A1* | 6/2014 | Zinco .................... G06F 30/392 716/112 |

FOREIGN PATENT DOCUMENTS

| CN | 103164572 | 6/2013 |
| CN | 105895145 | 8/2016 |

(Continued)

OTHER PUBLICATIONS

"International Search Report (Form PCT/ISA/210) of PCT/CN2022/095540," mailed on Nov. 29, 2022, pp. 1-4.

*Primary Examiner* — Paul Dinh
(74) *Attorney, Agent, or Firm* — JCIPRNET (57) ABSTRACT

The present disclosure discloses a method for extracting parasitic capacitance of interconnection lines of an integrated circuit based on discontinuous Galerkin finite element method. The method includes: dividing non-uniform rectangular grids according to the distribution situation of conductors; determining whether the rectangular grids are boundary cell grids, and marking global numbers and numbers to be solved in sequence; initializing degree of freedom values of all rectangular grids; traversing all rectangular grids, obtaining a linear system of equations, and computing potential function degrees of freedom of all rectangular grids; obtaining an electric field strength function degree of freedom of each cell according to the potential function degree of freedom of each rectangular grid; and dividing a Gaussian surface of each conductor, performing integration of the determined electric field strength function on the
(Continued)

Gaussian surface to obtain electric charge, and finally, obtaining main conductor capacitance and coupling capacitance.

10 Claims, 3 Drawing Sheets

(51) Int. Cl.
*G06F 30/392* (2020.01)
*G06F 30/398* (2020.01)
*G06F 111/10* (2020.01)

(58) Field of Classification Search
CPC ...... G06F 30/33; G06F 30/347; G06F 30/367; G06F 30/20
USPC .......................................................... 716/100
See application file for complete search history.

(56) References Cited

FOREIGN PATENT DOCUMENTS

| | | |
|---|---|---|
| CN | 114357942 | 4/2022 |
| EP | 2858246 | 4/2015 |

\* cited by examiner

METHOD FOR EXTRACTING PARASITIC CAPACITANCE OF INTERCONNECTION LINES OF INTEGRATED CIRCUIT BASED ON DISCONTINUOUS GALERKIN FINITE ELEMENT METHOD

CROSS-REFERENCE TO RELATED APPLICATION

This application is a 371 of international application of PCT application serial no. PCT/CN2022/095540, filed on May 27, 2022, which claims the priority benefit of China application no. 202210263251.3, filed on Mar. 17, 2022. The entirety of each of the above mentioned patent applications is hereby incorporated by reference herein and made a part of this specification.

TECHNICAL FIELD

The present disclosure relates to integrated circuit design, and specifically discloses a method for extracting parasitic capacitance of interconnection lines of an integrated circuit based on discontinuous Galerkin finite element method, belonging to the technical field of computation, calculation or counting.

RELATED ART

With the development of the science and technology, circuit optimization design has become an important stage in the integrated circuit design process. The purpose of circuit optimization is to improve the electrical properties of a circuit. The final actual electrical properties of the circuit not only depend on the parameter values of devices of the circuit, but also depend on the parasitic effect of the devices, the parasitic effect between the devices, the parasitic effect of connection lines, the parasitic effect between the connection lines, and the parasitic effect between the connection lines and the devices. Moreover, the parasitic effect between adjacent connection lines is particularly critical. In terms of circuit optimization theory, in order to obtain accurate circuit optimization results, it is necessary to accurately consider the parasitic effect between connection lines of various devices on the designed circuit, especially the parasitic effect generated between capacitance, that is, parasitic capacitance.

With the development of the semiconductor process, how to accurately and quickly extract parasitic capacitance is critical to ensure the chip design quality, meet strict PPA index requirements, and shorten the design cycle. The computation of capacitance of interconnection lines is a classic problem and mainstream demand in the field of electronic design automation (EDA) of integrated circuits. The innovation and optimization of algorithms are endless, which is a continuous research hotspot.

Early analysis methods for extracting parasitic parameters are only suitable for some very simple interconnection structures. With the increasing complexity of interconnection structures and the gradual improvement of solution accuracy requirements, direct field solution has become an effective method for extracting parasitic capacitance of interconnection lines. However, for huge interconnection structures, the complete direct field solution takes a lot of time and requires a large running memory, which cannot meet the requirements of EDA of large-scale integrated circuits. Region discretization methods such as a finite difference method and finite element method can solve the problem of high time cost of a direct field solution method for processing huge interconnection structures. However, the finite difference method has relatively strict requirements for grid division, and the accuracy needs to be improved. Moreover, when the adaptive adjustment of accuracy is realized by finite element method, the processing of suspension points is relatively difficult. Therefore, it is urgent to develop a method for extracting parasitic capacitance between interconnection lines of an integrated circuit, which has high accuracy, short running time and small running memory. The present disclosure aims to provide a method for extracting parasitic capacitance of interconnection lines of an integrated circuit based on discontinuous Galerkin finite element method.

SUMMARY OF INVENTION

In view of the defects of the above background art, the present disclosure provides a method for extracting parasitic capacitance of interconnection lines of an integrated circuit based on discontinuous Galerkin finite element method. By non-uniform division of grids based on finite element method, the accuracy required by industry standards is met, while the running time is shortened, thereby solving the technical problem that the existing method for extracting parasitic capacitance of interconnection lines needs to sacrifice one index of extraction accuracy and running time to meet the performance improvement requirements of another index.

The present disclosure adopts the following technical solution to realize the above invention objective.

Disclosed is a method for extracting parasitic capacitance of interconnection lines of an integrated circuit based on discontinuous Galerkin finite element method, including steps S1 to S6.

S1: For any given distribution situation of conductors, first, reading the coordinates of a lower left point and an upper right point of an integrated circuit layout region; for each conductor, approximatively fitting the shape of the conductor by a plurality of cuboids, reading the coordinates of a lower left point and an upper right point of each cuboid and recording numbers, reading all point coordinates, and classifying the point coordinates into row and column coordinates; and performing interval division of the gap between the row (or column) coordinates of every two adjacent conductors: first, uniformly extending an interval of a minimum mingap for several times outward at positions close to boundary rows (or columns) of two conductors, after several times of equidistant division, gradually extending the interval with a gaptime multiple, and then, performing non-equidistant division until the distance between the boundary rows (or columns) of two adjacent conductors after extension is less than the interval after re-extension, thereby forming the grid division which is uniform and dense close to conductor boundaries and is non-uniform and sparse away from conductor boundaries.

S2: After obtaining a region to be solved divided into small rectangular cells, computing the information of each grid cell, determining whether each grid cell is a boundary cell (marked with a flag), obtaining a horizontal dx length and a longitudinal dy length of each grid cell, and marking each grid cell with a global number; and traversing all grid cells, assigning the grid cells which are not boundary cells with second numbers recorded as "numbers of cells to be solved", and establishing the mapping relationship between the global numbers and the numbers of the cells to be solved.

S3: Traversing all global cells from zero, and if the flag of the cell indicates that the cell is a boundary cell, assigning a potential degree of freedom of the cell in advance; generally, for the boundaries of the region to be solved and the boundaries of non-main conductors, assigning all potential degrees of freedom as 0; and if the boundary cell is a main conductor boundary cell, setting the constant term of the potential degree of freedom of the boundary cell as 1, and setting the constant terms of the potential degrees of freedom of other boundary cells as 0.

S4: Traversing all grid cells to be solved from zero until all numbers of cells to be solved are traversed: for each grid cell, first, analyzing whether an adjacent cell of the grid cell is a boundary cell, and obtaining different electrostatic field strength equations according to whether the adjacent cell of the grid cell is a boundary cell, a specific algorithm using an LDG format of discontinuous Galerkin finite element method. Taking a specific grid cell k as an example, analyzing six adjacent grid cells kn, Knn, Ks, Ke, Kee and Kw, and assigning electrostatic field strength equations in an LDG format according to whether the 6 grid cells are boundary cells.

S5: Combining the electrostatic field strength equations derived by analyzing the boundaries of all grid cells to be solved into a linear system of equations in the form of $A*\vec{u}=\vec{b}$, and solving the linear system of equations to obtain a potential degree of freedom of each cell to be solved.

S6: Since an electric field strength degree of freedom of each grid cell can be derived from the potential degree of freedom, after the potential degree of freedom is obtained, computing the electric field strength degree of freedom, and obtaining an electric field strength in the x-axis direction and an electric field strength in the y-axis direction of each grid cell; since each cuboid is numbered in S1, traversing all cuboids from zero: taking all cuboids with the same number as the same conductor, taking the leftmost, rightmost, uppermost and lowermost edges of all cuboids in each conductor as four edges of the conductor, and extending a grid from the four edges outward as a Gaussian surface for integration; and specifically, multiplying the upper and lower edges by the electric field strength in the y direction to obtain a product, multiplying the left and right edges by the electric field strength in the x direction to obtain a product, adding all values to obtain the quantity of electric charge of a specific conductor, and resolving the capacitance of the main conductor and the coupling capacitance of other conductors according to the relationship between the quantity of electric charge and the capacitance.

The present disclosure adopting the above technical solution has the following beneficial effects.

(1) The discontinuous Galerkin finite element method provided by the present disclosure inherits all the advantages of the finite element method and provides a near-dense and far-sparse non-uniform grid division way. The solution accuracy is increased by densifying the grids near conductor cell boundaries to solve the problem of singularity of numerical solutions near boundary regions in solving problems, and local grid adaption is realized by modifying grid division parameters. During computation, a set of primary functions are respectively taken for discontinuous grid cells to avoid the problem of continuous occurrence of suspension points in a certain range due to primary functions when accuracy adaption is realized by the traditional finite element method. When the discontinuous Galerkin finite element method provided by the present disclosure is used for extracting parasitic capacitance of integrated circuits in different scales, the extraction accuracy required by the industry standards can be obtained with less running time. Compared with the traditional finite element method, the present disclosure has the technical advantages of increasing the extraction accuracy of parasitic capacitance of interconnection lines of an integrated circuit, shortening the running time, reducing the running memory, and being easy to realize adaptive adjustment of the accuracy.

(2) The discontinuous Galerkin finite element method provided by the present disclosure has high accuracy, the desired accuracy can be obtained conveniently only by modifying one accuracy parameter in a program, and grid division parameters can be modified slightly to well deal with various complex boundary situations and grid divisions. Compared with a finite difference method, the present disclosure has the technical advantages of flexible grid division, adaptive adjustment of extraction accuracy, and short running time.

DESCRIPTION OF EMBODIMENTS

In order to enable persons skilled in the art to better understand the solutions in the embodiments of the present disclosure, the following describes the embodiments of the present disclosure in more detail with reference to accompanying drawings and implementations.

Figure 1:
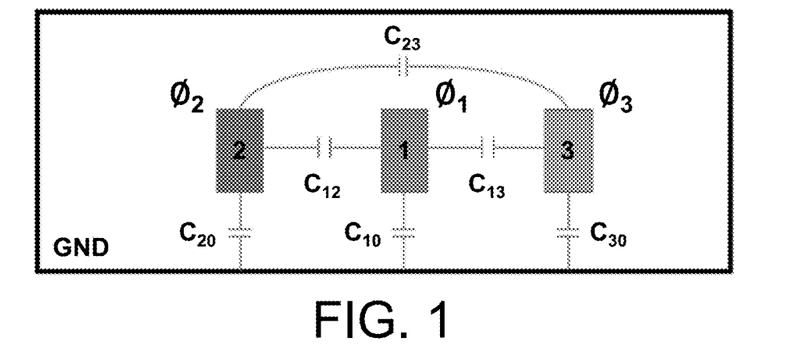
FIG. 1 is an equivalent circuit diagram of an electromagnetic coupling effect of an integrated circuit.

An integrated circuit shown in FIG. 1 includes: a main conductor 1, a second conductor 2 adjacent to the main conductor, and a third conductor 3 adjacent to the main conductor. The potential on the main conductor 1, the second conductor 2 and the third conductor 3 is $\varphi_1$, $\varphi_2$ and P3 respectively, the capacitance of the main conductor 1, the second conductor 2 and the third conductor 3 is $C_{20}$, $C_{10}$ and $C_{30}$ respectively, the parasitic capacitance of an interconnection line between the main conductor 1 and the second conductor 2 is $C_{12}$, the parasitic capacitance of an interconnection line between the main conductor 1 and the third conductor 3 is $C_{13}$, and the parasitic capacitance of an interconnection line between the second conductor 2 and the third conductor 3 is $C_{23}$.

Figure 2:
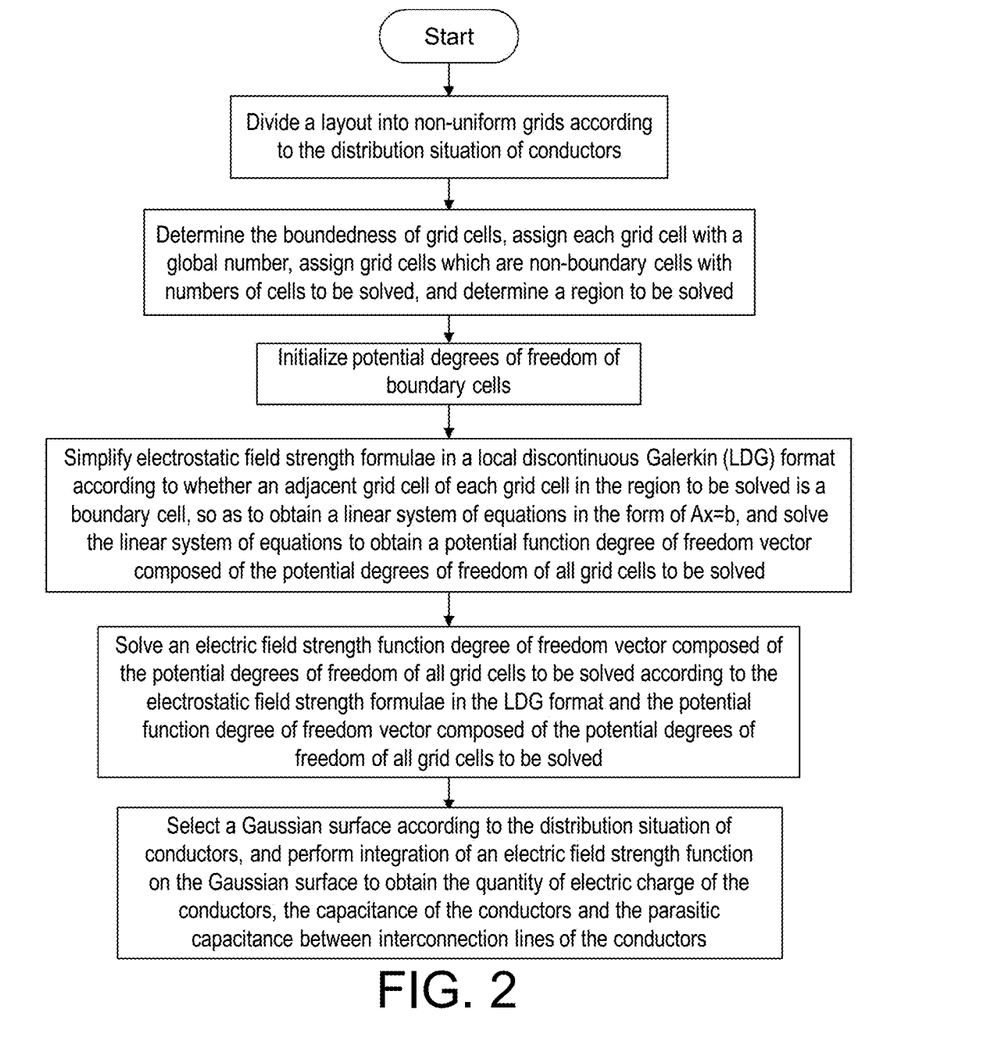
FIG. 2 is a flow diagram of a method for extracting parasitic capacitance of interconnection lines provided by the present disclosure.

As shown in FIG. 2, a method for extracting parasitic capacitance of interconnection lines of an integrated circuit based on discontinuous Galerkin finite element method, provided by the present disclosure, includes the following six steps.

Step 1: After the Data of Each Conductor is Read, an Integrated Circuit Layout is Divided into Non-Uniform Grids.

Figure 3A:
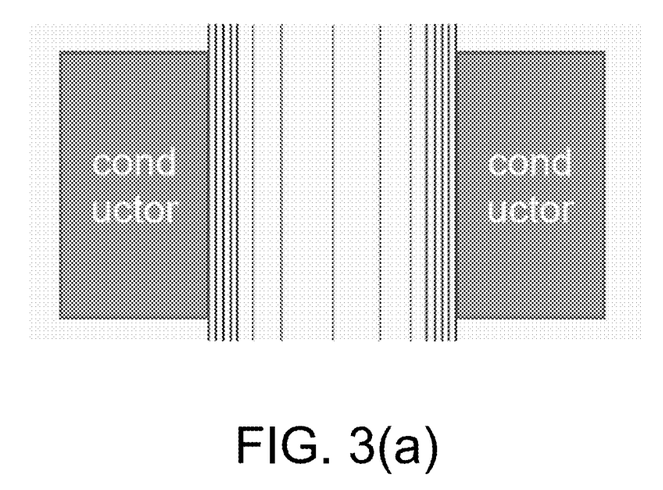
FIG. 3(a) is a schematic diagram of grid division between two adjacent conductor boundaries.

For any given distribution situation of conductors, first, the coordinates of a lower left point and an upper right point of a layout region occupied by each conductor are read. For each conductor, the shape of the conductor is approximatively fit by a plurality of cuboids, the coordinates of a lower left point and an upper right point of each cuboid are read and numbers are recorded, and all read point coordinates are classified into row and column coordinates. Interval division of the gap between the row (or column) coordinates of every two adjacent conductors is performed: first, an interval of a minimum mingap is uniformly extended for several times outward at positions close to boundary rows (or columns) of two conductors, after several times of equidistant division, the interval is gradually extended with a gaptime multiple, and then, non-equidistant division is performed until the distance between the boundary rows (or columns) of two adjacent conductors after extension is less than the interval after re-extension, thereby forming the grid division which is uniform and dense close to conductor boundaries and is non-uniform and sparse away from conductor boundaries. Boundary grids between two adjacent conductors are shown in FIG. 3(a).

Step 2: The Boundedness and Numbers of Grid Cells are Set.

Figure 3B:
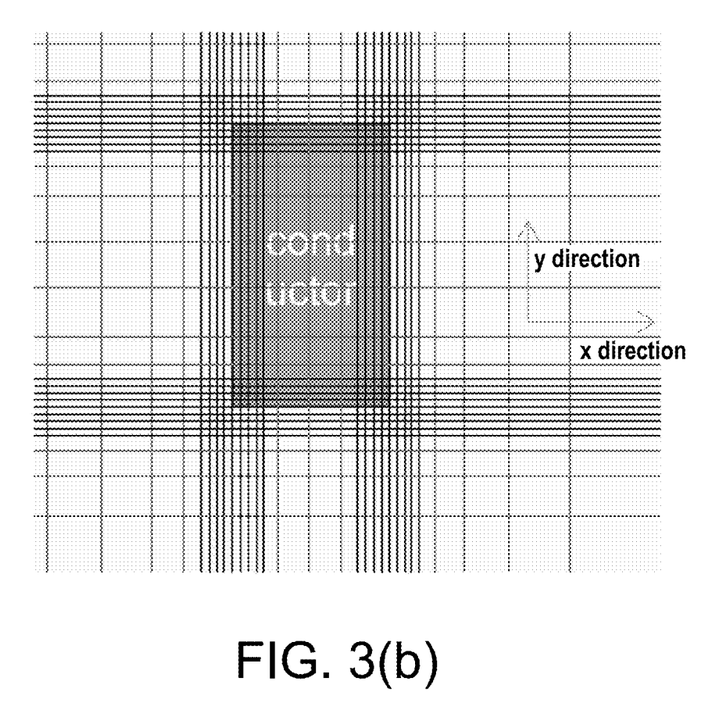
FIG. 3(b) is a schematic diagram of grid division of a local region to be solved.

The above non-uniform division is performed on the interval between the conductors in the integrated circuit layout to obtain a region to be solved composed of small rectangular grid cells, whether the grid cells are boundary cells are determined, a horizontal dx length and a longitudinal dy length of each grid cell are obtained, and each grid cell is marked with a global number. The present disclosure defines the grid cells outside the boundaries of the region to be solved and the grid cells in a region where the conductors are located as boundary cells. The grid division of a local region to be solved is shown in FIG. 3(b). Each grid cell is traversed, the grid cells which are not boundary cells are assigned with second numbers recorded as "numbers of cells to be solved", and the mapping relationship between the global numbers and the numbers of the cells to be solved is established.

Step 3: The Degrees of Freedom of all Grid Cells are Initialized, Electrostatic Field Strength Formulae in an LDG Format are Obtained According to Whether Adjacent Grid Cells of the Grid Cells to be Solved are Boundary Cells, and Potential Function Degrees of Freedom and Electric Field Strength Function Degrees of Freedom of all Grid Cells to be Solved are Solved.

The potential of each point in the grid cell to be solved is recorded as u(x, y), the electric field strength in the x direction of each point is recorded as p(x, y), and the electric field strength in the y direction of each point is recorded as q(x, y), that is, $$u_x(x,y)=p(x,y), u_y(x,y)=q(x,y).$$

Therefore, the original electrostatic field strength formula $\Delta u(x, y)=0$ can be written in the form of $p_x+q_y=0$, and then, a set of primary functions $\varphi_1 (x, y), \ldots, \varphi_p (x, y)$ are taken on each grid cell k. In this way, a potential function and an electric field strength function on each grid cell can be approximately expressed in the form of $\Sigma_{l+1}{}^P u_l*\varphi_l$, $\Sigma_{l+1}{}^P p_l*\varphi_l, \Sigma_{l+1}{}^P q_l*\varphi_l$, wherein $u_l, p_l, q_l$, represent degrees of freedom of the potential function and the electric field strength function on each grid cell. For each grid cell to be solved, the potential function u(x, y) and the electric field strength function p(x, y), q(x, y) on each grid cell to be solved are respectively multiplied by the primary function of each grid cell to be solved (equivalent to solving the projections of the potential function and the electric field strength function on the primary function of each grid cell to be solved), and integration is performed on the grid cell to be solved. The electrostatic field strength formulae are expressed by the following formulae:

$$\iint_k [p_x(x,y)+q_y(x,y)]\varphi_l(x,y)dk = \iint_k 0*\varphi_l(x,y)dk,$$

$$\iint_k p(x,y)*\varphi_l(x,y)dk = \iint_k u_x(x,y)*\varphi_l(x,y)dk,$$

$$\iint_k q(x,y)*\varphi_l(x,y)dk = \iint_k u_y(x,y)*\varphi_l(x,y)dk,$$

Figure 4A:
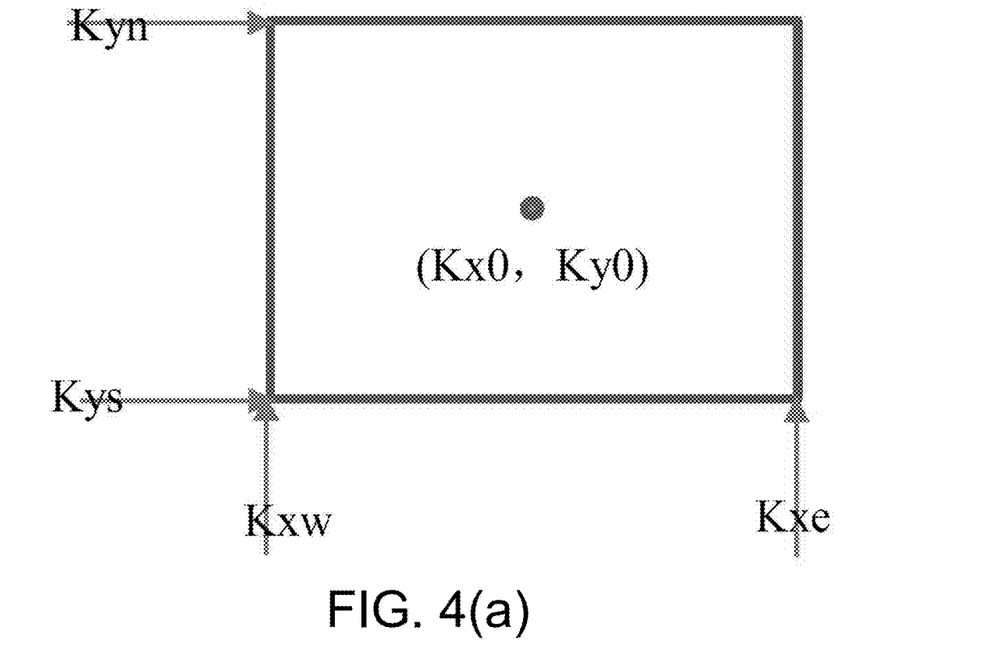
FIG. 4(a) is a schematic diagram of boundaries of a grid cell k.

Three formulae in an LDG format, as shown in Formulae (1), (2) and (3), are obtained:

$$\int_{K_{xw}}^{K_{xe}} [\hat{q}_{K_{yn}}(x)\varphi_{l_{K_{yn}}}^-(x) - \hat{q}_{K_{ys}}(x)\varphi_{l_{K_{ys}}}^+(x)]dx - \qquad (1)$$

$$\int\int_K q(x,y) * \frac{\partial \varphi_l(x,y)}{\partial y} dk +$$

$$\int_{K_{ys}}^{K_{yn}} [\hat{p}_{K_{xe}}(y)\varphi_{l_{K_{xe}}}^-(y) - \hat{p}_{K_{xw}}(y)\varphi_{l_{K_{xw}}}^+(y)]dy -$$

$$\int\int_K p(x,y) * \frac{\partial \varphi_l(x,y)}{\partial x} dk = 0,$$

$$\int_K p(x,y)*\varphi_l(x,y)dk = \int_{K_{ys}}^{K_{yn}} [\hat{u}_{K_{xe}}(y)*\varphi_{l_{K_{yn}}}^-(y) - \hat{u}_{K_{xw}}(y)*\varphi_{l_{K_{ys}}}^+(y)]dy \qquad (2)$$

$$- \int_K u(x,y) * \frac{\partial \phi_l(x,y)}{\partial x} dk,$$

$$\int_K q(x,y)*\phi_l(x,y)dk = \qquad (3)$$

$$\int_{K_{xw}}^{K_{xe}} [\hat{u}_{K_{yn}}(x)*\varphi_{l_{K_{yn}}}^-(x) - \hat{u}_{K_{ys}}(x)*\varphi_{l_{K_{ys}}}^+(x)]dx -$$

$$\int_K u(x,y) * \frac{\partial \varphi_l(x,y)}{\partial y} dk,$$

wherein $K_{xw}$, $K_{xe}$ represent a left boundary and a right boundary of a grid cell k, $K_{ys}$, $K_{yn}$ represent a lower boundary and an upper boundary of the grid cell k, the four boundaries of the grid cell k are shown in FIG. 4(a), and (Kx0, Ky0) represents central coordinates of the grid cell k; $\hat{q}$, $\hat{p}$, $\hat{u}$ represent numerical fluxes, $\hat{q}_{K_{ys}}$ (x) represents a numerical flux of an electric field strength q(x, −½) at the lower boundary of the grid cell k, q(x, −½) represents an electric field strength at the lower boundary of the grid cell k, $\hat{q}_{K_{yn}}$ (x) represents a numerical flux of an electric field strength q(x, ½) at the upper boundary of the grid cell k, q(x, ½) represents an electric field strength at the upper boundary of the grid cell k, $\hat{p}_{K_{xw}}$ (y) represents a numerical flux of an electric field strength p(−½, y) at the left boundary of the grid cell k, p(−½, y) represents an electric field strength at the left boundary of the grid cell k, $\hat{p}_{K_{xe}}$ (y) represents a numerical flux of an electric field strength p(½, y) at the right boundary of the grid cell k, p(½, y) represents an electric field strength at the right boundary of the grid cell k, $\hat{u}_{K_{xe}}$ (y) represents a numerical flux of a potential u(½, y) at the right boundary of the grid cell k, u(½, y) represents a potential at the right boundary of the grid cell k, $\hat{u}_{K_{xw}}$ (y) represents a numerical flux of a potential u(−½, y) at the left boundary of the grid cell k, u(−½, y) represents a potential at the left boundary of the grid cell k, $\hat{u}_{K_{yn}}(x)$ represents a numerical flux of a potential $u(x, \frac{1}{2})$ at the upper boundary of the grid cell k, $u(x, \frac{1}{2})$ represents a potential at the upper boundary of the grid cell k, $\hat{U}_{K_{ys}}(x)$ represents a numerical flux of a potential $u(x, -\frac{1}{2})$ at the lower boundary of the grid cell k, and $u(x, -\frac{1}{2})$ represents a potential at the lower boundary of the grid cell k; and $\varphi_{l_{K_{yn}}}^{-}(x)$ represents a flux (that is, value) of a primary function $\varphi_l(x, \frac{1}{2})$ below the upper boundary of the grid cell k, $\varphi_l(x, \frac{1}{2})$ represents a value of the lth primary function of the grid cell k at the upper boundary, $\varphi_{l_{K_{ys}}}^{+}(x)$ represents a flux of a primary function $\varphi_l(x, -\frac{1}{2})$ above the lower boundary of the grid cell k, $\varphi_l(x, -\frac{1}{2})$ represents a value of the lth primary function of the grid cell k at the lower boundary, $\varphi_{l_{K_{xe}}}^{-}(y)$ represents a flux of a primary function $\varphi_l(\frac{1}{2}, y)$ on the left of the right boundary of the grid cell k, $\varphi_l(\frac{1}{2}, y)$ represents a value of the lth primary function of the grid cell k at the right boundary, $\varphi_{l_{K_{xw}}}^{+}(y)$ represents a flux of a primary function $\varphi_l(-\frac{1}{2}, y)$ on the right of the left boundary of the grid cell k, and $\varphi_l(-\frac{1}{2}, y)$ represents a value of the lth primary function of the grid cell k at the left boundary.

Figure 4B:
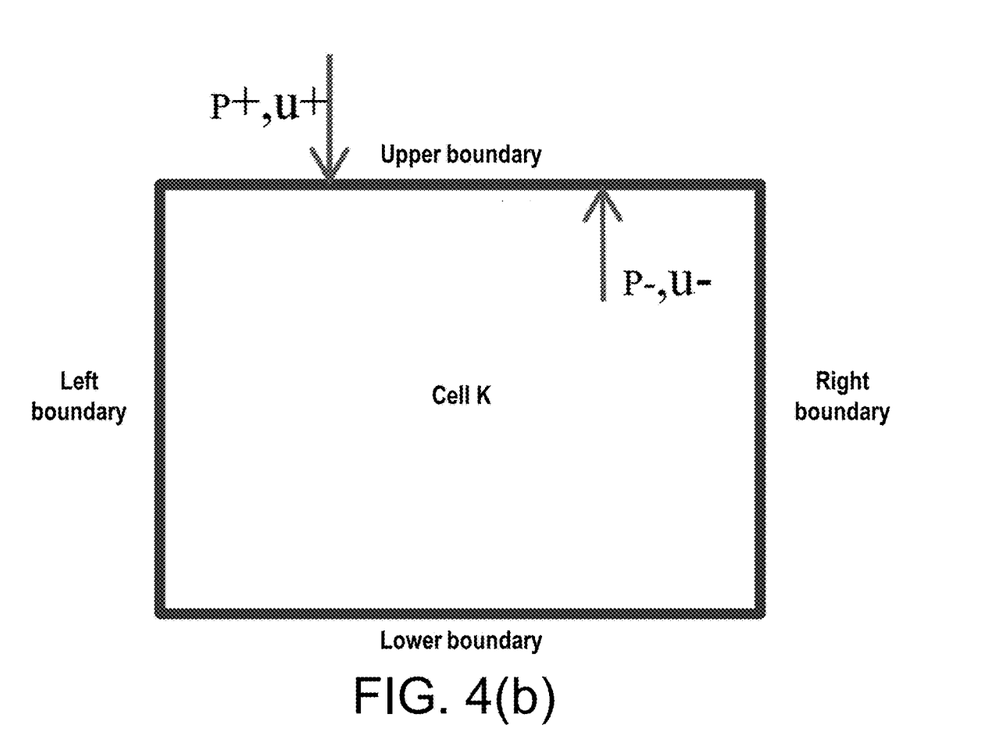
FIG. 4(b) is a schematic diagram of potential and electric field strength fluxes on the boundaries of the grid cell k.

As shown in FIG. 4(b), p, q and u on the upper and right sides of the boundary of the grid cell are assigned with symbols $p^+$, $q^+$, $u^+$, p, q and u on the lower and left sides of the boundary of the grid cell are assigned with symbols $p^-$, $q^-$, $u^-$, and the actual potential of the boundary is recorded as $u^{exact}$.

When the adjacent grid cell of the grid cell k is not a boundary cell, $$\hat{u}=u^-, \hat{p}=p^++u^+-u^-, \hat{q}=q^++u^+-u^-.$$

When the adjacent grid cell of the grid cell k is a boundary cell, $$\hat{u}=u^{exact}.$$

For p at the left boundary of the grid cell k, $\hat{p}=p^++u^+-u^{exact}$.

For p at the right boundary of the grid cell k, $\hat{p}=p^-+u^{exact}-u^-$.

For q at the lower boundary of the grid cell k, $\hat{q}=q^++u^+-u^{exact}$.

For q at the upper boundary of the grid cell k, $\hat{q}=q^-+u^{exact}-u^-$.

The potential degrees of freedom of each grid cell k and adjacent grid cells $K_n$, $K_s$, $K_e$, $K_w$ thereof together produce a set of vectors $\vec{u}_k, \vec{u}_{k_n}, \vec{u}_{k_s}, \vec{u}_{k_e}, \vec{u}_{k_w}$. According to the formulae (1), (2) and (3), for each grid cell k to be solved, a formula in the form of $A_k*\vec{u}_k+A_{k_n}*\vec{u}_{k_n}+A_{k_s}*\vec{u}_{k_s}+A_{k_e}*\vec{u}_{k_e}+A_{k_w}*\vec{u}_{k_w}=0$ can be listed. All grid cells to be solved are traversed, and the equations of all grid cells to be solved are combined into a large linear system of equations in the form of Au=b, so as to obtain a potential degree of freedom on each grid cell to be solved, thereby obtaining the potential of each grid cell and further obtaining the electric field strength.

However, since each grid cell needs to consider the boundedness of the adjacent grid cell, Formula (1) is divided into 6 modules, and processing conditions at the boundaries of each module are considered respectively. The 6 modules are:

Module I:

$$\int_{K_{xw}}^{K_{xe}}[\hat{q}_{K_{yn}}(x)*\varphi_{l_{K_{yn}}}^{-}(x)]dx.$$

Module II:

$$\int_{K_{xw}}^{K_{xe}}[-\hat{q}_{K_{ys}}(x)*\varphi_{l_{K_{ys}}}^{+}(x)]dx.$$

$$-\int\int_k q(x,y)*\frac{\partial \varphi_l(x,y)}{\partial y}dk. \qquad \text{Module III}$$

Module IV:

$$\int_{K_{ys}}^{K_{yn}}[\hat{p}_{K_{xe}}(y)*\varphi_{l_{K_{xe}}}^{-}(y)]dy.$$

Module V:

$$\int_{K_{ys}}^{K_{yn}}[\hat{p}_{K_{xe}}(y)*\varphi_{l_{K_{xe}}}^{-}(y)]dy.$$

$$-\int\int_k p(x,y)*\frac{\partial \varphi_l(x,y)}{\partial x}dk. \qquad \text{Module VI}$$

Since it is found that the finally written coefficient matrix in the form of multiplication of matrix vectors of each module can be obtained by addition, subtraction and multiplication of the following 11 matrices, first, the concepts of a reference grid cell and a primary function on the reference grid cell are introduced. The significance of the primary function of the reference grid cell is that the form of the primary function of each grid cell can be changed into the form of the primary function on the reference grid cell through some transformations, so that for the subsequent processing and operation of the primary function of each grid cell, it is only necessary to perform processing and operation on the reference grid cell.

First, the symbols of the primary function on the reference grid cell are defined as: $\dot\varphi_0, \dot\varphi_1, \dot\varphi_2, \ldots, \dot\varphi_p$, and the region of the reference grid cell is $[-\frac{1}{2}, \frac{1}{2}] \times [-\frac{1}{2}, \frac{1}{2}]$.

Subsequently, the following symbols $C^{\varphi\varphi}$, $C^{\varphi\varphi x}$, $C^{\varphi\varphi y}$, $X_{nn}$, $X_{ns}$, $X_{sn}$, $X_{ss}$, $Y_{ee}$, $Y_{ew}$, $Y_{we}$ and $Y_{ww}$ are introduced to indicate that 11 matrices of a coefficient matrix in the form of multiplication of matrices of each module can be obtained by operations:

$$C^{\varphi\varphi}:C_{ij}^{\varphi\varphi}=\iint_{K_{base}}\dot\varphi_i(x,y)*\varphi_j(x,y)dxdy,$$

$$C^{\varphi\varphi x}:C_{ij}^{\varphi\varphi x}=\iint_{K_{base}}\frac{\partial \phi_i(x,y)}{\partial x}*\dot\varphi_j(x,y)dxdy,$$

$$C^{\varphi\varphi y}:C_{ij}^{\varphi\varphi y}=\iint_{K_{base}}\frac{\partial \phi_i(x,y)}{\partial y}*\dot\varphi_j(x,y)dxdy,$$

$$X_{nn}:X_{nn}^{ij}=\int_{-1/2}^{1/2}\dot\varphi_j(x,-\frac{1}{2})*\varphi_i(x,-\frac{1}{2})dx,$$

$$X_{ns}:X_{ns}^{ij}=\int_{-1/2}^{1/2}\dot\varphi_j(x,\frac{1}{2})*\varphi_i(x,-\frac{1}{2})dx,$$

$$X_{sn}:X_{sn}^{ij}=\int_{-1/2}^{1/2}\dot\varphi_j(x,-\frac{1}{2})*\varphi_i(x,\frac{1}{2})dx,$$

$$X_{ss}:X_{ss}^{ij}=\int_{-1/2}^{1/2}\dot\varphi_j(x,\frac{1}{2})*\varphi_i(x,\frac{1}{2})dx,$$

$$Y_{ee}:Y_{ee}^{ij}=\int_{-1/2}^{1/2}\dot\varphi_j(-\frac{1}{2},y)*\varphi_i(-\frac{1}{2},y)dy,$$

$$Y_{ew}:Y_{ew}^{ij}=\int_{-1/2}^{1/2}\dot\varphi_j(\frac{1}{2},y)*\varphi_i(-\frac{1}{2},y)dy,$$

$$Y_{we}:Y_{we}^{ij}=\int_{-1/2}^{1/2}\dot\varphi_j(-\frac{1}{2},y)*\varphi_i(\frac{1}{2},y)dy,$$

$$Y_{ww}:Y_{ww}^{ij}=\int_{-1/2}^{1/2}\dot\varphi_j(\frac{1}{2},y)*\varphi_i(\frac{1}{2},y)dy,$$

wherein $C_{ij}^{\varphi\varphi}$ represents a projection of the ith primary function $\dot\varphi_i(x, y)$ of a reference grid cell $K_{base}$ on the jth primary function (x, y), $C_{ij}^{\varphi\varphi_x}$ represents a projection of a derivative in the x direction of the ith primary function of the reference grid cell $K_{base}$ on the jth primary function $\dot{\varphi}_j(x, y)$, $C_{ij}^{\varphi\varphi_y}$ represents a projection of a derivative in the y direction of the ith primary function of the reference grid cell $K_{base}$ on the jth primary function (x, y), $X_{nn}^{ij}$ represents a product of the value $\dot{\varphi}_j(x, -\frac{1}{2})$ of the jth primary function of the reference grid cell $K_{base}$ at the lower boundary and the value $\varphi_i(x, -\frac{1}{2})$ of the ith primary function at the lower boundary, $X_{ns}^{ij}$ represents a product of the value $\varphi_j(x, \frac{1}{2})$ of the jth primary function of the reference grid cell $K_{base}$ at the upper boundary and the value $\varphi_i(x, -\frac{1}{2})$ of the ith primary function at the lower boundary, $X_{sn}^{ij}$ represents a product of the value $\dot{\varphi}_j(x, -\frac{1}{2})$ of the jth primary function of the reference grid cell $K_{base}$ at the lower boundary and the value $\varphi_i(x, \frac{1}{2})$ of the ith primary function at the upper boundary, $X_{ss}^{ij}$ represents a product of the value $\dot{\varphi}_j(x, \frac{1}{2})$ of the jth primary function of the reference grid cell $K_{base}$ at the upper boundary and the value $\dot{\varphi}_i(x, \frac{1}{2})$ of the ith primary function at the upper boundary, $y_{ee}^{ij}$ represents a product of the value $\dot{\varphi}_j(-\frac{1}{2}, y)$ of the jth primary function of the reference grid cell $K_{base}$ at the left boundary and the value $\dot{\varphi}_i(-\frac{1}{2}, y)$ of the ith primary function at the left boundary, $Y_{ew}^{ij}$ represents a product of the value $\dot{\varphi}_j(\frac{1}{2}, y)$ of the jth primary function of the reference grid cell $K_{base}$ at the right boundary and the value $\dot{\varphi}_i(-\frac{1}{2}, y)$ of the ith primary function at the left boundary, $Y_{we}^{ij}$ represents a product of the value of the $$\dot{\phi}_j\left(-\frac{1}{2}, y\right)$$

jth primary function of the reference grid cell $K_{base}$ at the left boundary and the value $\dot{\varphi}_i(\frac{1}{2},y)$ of the ith primary function at the right boundary, and $Y_{ww}^{ij}$ represents a product of the value $$\dot{\phi}_j\left(-\frac{1}{2}, y\right)$$

of the jth primary function of the reference grid cell $K_{base}$ at the right boundary and the value $\dot{\varphi}_i(\frac{1}{2}, y)$ of the ith primary function at the right boundary.

Now, the grid cells to be solved are traversed in sequence. For the module I, when $K_n$, $K_{nn}$ (that is, an upper boundary cell and a boundary cell above the upper boundary cell of the grid cell k) are both not boundary cells, the form of the module I is:

$$\left(\frac{\Delta x_k}{\Delta y_{kn}} * X_{ns} * (C^{\varphi\varphi})^{-1} * (X_{ss} - C^{\varphi\varphi_y}) + \Delta x_k * X_{ns}\right) * \overrightarrow{u_k} +$$

$$\left(-\frac{\Delta x_k}{\Delta y_{kn}} * X_{ns} * (C^{\varphi\varphi})^{-1} * X_{sn} - \Delta x_k * X_{ss}\right) * \overrightarrow{u_k},$$

when $K_n$ is a non-boundary cell, but $K_{nn}$ is a boundary cell, the form of the module I is:

$$\left(\frac{\Delta x_k}{\Delta y_{kn}} * X_{ns} * (C^{\varphi\varphi})^{-1} * X_{ns}\right) * \overrightarrow{u_{knn}} +$$

$$\left(-\frac{\Delta x_k}{\Delta y_{kn}} * X_{ns} * (C^{\varphi\varphi})^{-1} * C^{\varphi\varphi_y} + \Delta x_k * X_{ns}\right) * \overrightarrow{u_{kn}} +$$

$$\left(-\frac{\Delta x_k}{\Delta y_{kn}} * X_{ns} * (C^{\varphi\varphi})^{-1} * X_{sn} - \Delta x_k * X_{ss}\right) * \overrightarrow{u_k},$$

and when $K_n$ is a boundary cell, the boundedness of $K_{nn}$ no longer has an impact (after that, only when $K_{nn}$ and $K_{ee}$ are mentioned, the boundedness of $K_{nn}$ is considered), and then, the form of the module I is:

$$\left(\frac{\Delta x_k}{\Delta y_k} * X_{ss} * (C^{\varphi\varphi})^{-1} * X_{ns} + \Delta x_k * X_{ns}\right) * \overrightarrow{u_{kn}} +$$

$$\left(-\frac{\Delta x_k}{\Delta y_k} * X_{ss} * (C^{\varphi\varphi})^{-1} * C^{\varphi\varphi_y} - \Delta x_k * X_{ss}\right) * \overrightarrow{u_k} +$$

$$\left(-\frac{\Delta x_k}{\Delta y_k} * X_{ss} * (C^{\varphi\varphi})^{-1} * X_{sn}\right) * \overrightarrow{u_{ks}},$$

For the module II, when $K_n$ is not a boundary cell, the form of the module II is:

$$\left(-\frac{\Delta x_k}{\Delta y_k} * X_{nn} * (C^{\varphi\varphi})^{-1} * (X_{ss} - C^{\varphi\varphi_y}) - \Delta x_k * X_{nn}\right) * \overrightarrow{u_k} +$$

$$\left(\frac{\Delta x_k}{\Delta y_k} * X_{nn} * (C^{\varphi\varphi})^{-1} * X_{sn} + \Delta x_k * X_{sn}\right) * \overrightarrow{u_{ks}},$$

and when $K_n$ is a boundary cell, the form of the module II is:

$$\left(-\frac{\Delta x_k}{\Delta y_k} * X_{nn} * (C^{\varphi\varphi})^{-1} * X_{ns}\right) * \overrightarrow{u_{kn}} +$$

$$\left(\frac{\Delta x_k}{\Delta y_k} * X_{nn} * (C^{\varphi\varphi})^{-1} * X_{sn} + \Delta x_k * X_{sn}\right) * \overrightarrow{u_{ks}} +$$

$$\left(\frac{\Delta x_k}{\Delta y_k} * X_{nn} * (C^{\varphi\varphi})^{-1} * C^{\varphi\varphi_y} - \Delta x_k * X_{nn}\right) * \overrightarrow{u_k}.$$

For the module III, when $K_n$ is not a boundary cell, the form of the module III is:

$$\left(-\frac{\Delta x_k}{\Delta y_k} * C^{\varphi\varphi_y} * (C^{\varphi\varphi})^{-1} * (X_{ss} - C^{\varphi\varphi_y})\right) * \overrightarrow{u_k} +$$

$$\left(\frac{\Delta x_k}{\Delta y_k} * C^{\varphi\varphi_y} * (C^{\varphi\varphi})^{-1} * X_{sn}\right) * \overrightarrow{u_{ks}},$$

and when $K_n$ is a boundary cell, the form of the module III is:

$$\left(-\frac{\Delta x_k}{\Delta y_k} * C^{\varphi\varphi_y} * (C^{\varphi\varphi})^{-1} * X_{ns}\right) * \overrightarrow{u_{kn}} +$$

$$\left(\frac{\Delta x_k}{\Delta y_k} * C^{\varphi\varphi_y} * (C^{\varphi\varphi})^{-1} * X_{sn}\right) * \overrightarrow{u_{ks}} + \left(\frac{\Delta x_k}{\Delta y_k} * C^{\varphi\varphi_y} * (C^{\varphi\varphi})^{-1} * C^{\varphi\varphi_y}\right) * \overrightarrow{u_k}.$$

For the module IV, when $K_e$ and $K_{ee}$ are both not boundary cells, the form of the module IV is:

$$\left(\frac{\Delta y_k}{\Delta x_{ke}} * Y_{ew} * (C^{\varphi\varphi})^{-1} * (Y_{ww} - C^{\varphi\varphi_x}) + \Delta y_k * Y_{ew}\right) * \overrightarrow{u_{ke}} +$$

-continued $$\left(-\frac{\Delta y_k}{\Delta x_{ke}} * Y_{ew} * (C^{\varphi\varphi})^{-1} * Y_{we} - \Delta y_k * Y_{ww}\right) * \vec{u_k},$$

when $K_e$ is not a boundary cell, but $K_{ee}$ is a boundary cell, the form of the module IV is:

$$\left(\frac{\Delta y_k}{\Delta x_{ke}} * Y_{ew} * (C^{\varphi\varphi})^{-1} * Y_{ew}\right) * \vec{u_{ee}} +$$

$$\left(-\frac{\Delta y_k}{\Delta x_{ke}} * Y_{ew} * (C^{\varphi\varphi})^{-1} * C^{\varphi\varphi_x} + \Delta y_k * Y_{ew}\right) * \vec{u_{ke}} +$$

$$\left(-\frac{\Delta y_k}{\Delta x_{ke}} * Y_{ew} * (C^{\varphi\varphi})^{-1} * Y_{we} - \Delta y_k * Y_{ww}\right) * \vec{u_k},$$

and when $K_e$ is a boundary cell, the form of the module IV is:

$$\left(\frac{\Delta y_k}{\Delta x_k} * Y_{ww} * (C^{\varphi\varphi})^{-1} * Y_{ew} + \Delta y_k * Y_{ew}\right) * \vec{u_{ke}} +$$

$$\left(-\frac{\Delta y_k}{\Delta x_k} * Y_{ww} * (C^{\varphi\varphi})^{-1} * C^{\varphi\varphi_x} - \Delta y_k * Y_{ww}\right) * \vec{u_k} +$$

$$\left(-\frac{\Delta y_k}{\Delta x_k} * Y_{ww} * (C^{\varphi\varphi})^{-1} * Y_{we}\right) * \vec{u_{kw}}.$$

For the module V, when $K_e$ is not a boundary cell, the form of the module V is:

$$\left(-\frac{\Delta y_k}{\Delta x_k} * Y_{ee} * (C^{\varphi\varphi})^{-1} * (Y_{ww} - C^{\varphi\varphi_x}) - \Delta y_k * Y_{ee}\right) * \vec{u_k} +$$

$$\left(\frac{\Delta y_k}{\Delta x_k} * Y_{ee} * (C^{\varphi\varphi})^{-1} * Y_{we} + \Delta y_k * Y_{we}\right) * \vec{u_{kw}},$$

and when $K_e$ is a boundary cell, the form of the module V is:

$$\left(-\frac{\Delta y_k}{\Delta x_k} * Y_{ee} * (C^{\varphi\varphi})^{-1} * Y_{ew}\right) * \vec{u_{ke}} +$$

$$\left(\frac{\Delta y_k}{\Delta x_k} * Y_{ee} * (C^{\varphi\varphi})^{-1} * Y_{we} + \Delta y_k * Y_{we}\right) * \vec{u_{kw}} +$$

$$\left(\frac{\Delta y_k}{\Delta x_k} * Y_{ee} * (C^{\varphi\varphi})^{-1} * C^{\varphi\varphi_x} - \Delta y_k * Y_{ee}\right) * \vec{u_k}.$$

For the module VI, when $K_e$ is not a boundary cell, the form of the module VI is:

$$\left(-\frac{\Delta y_k}{\Delta x_k} * C^{\varphi\varphi_x} * (C^{\varphi\varphi})^{-1} * (Y_{ww} - C^{\varphi\varphi_x})\right) * \vec{u_k} +$$

$$\left(\frac{\Delta y_k}{\Delta x_k} * C^{\varphi\varphi_x} * (C^{\varphi\varphi})^{-1} * Y_{we}\right) * \vec{u_{kw}};$$

and when $K_e$ is a boundary cell, the form of the module VI is:

$$\left(-\frac{\Delta y_k}{\Delta x_k} * C^{\varphi\varphi_x} * (C^{\varphi\varphi})^{-1} * Y_{ew}\right) * \vec{u_{ke}} +$$

$$\left(\frac{\Delta y_k}{\Delta x_k} * C^{\varphi\varphi_x} * (C^{\varphi\varphi})^{-1} * Y_{we}\right) * \vec{u_{kw}} + \left(\frac{\Delta y_k}{\Delta x_k} * C^{\varphi\varphi_x} * (C^{\varphi\varphi})^{-1} * C^{\varphi\varphi_x}\right) * \vec{u_k}.$$

$\Delta x_k$ represents a length of the grid cell k in the x direction, $\Delta y_k$ represents a length of the grid cell k in the y direction, $\Delta y_{kn}$ represents a length of an adjacent grid cell above the grid cell k in the y direction, $\vec{u_k}$ represents a potential function degree of freedom vector of the grid cell k, $\vec{u_{kn}}$ represents a potential function degree of freedom vector of a grid cell adjacent to the upper boundary of the grid cell k, $\vec{u_{ks}}$ represents a potential function degree of freedom vector of a grid cell adjacent to the lower boundary of the grid cell k, $\vec{u_{knn}}$ represents a potential function degree of freedom vector of a grid cell adjacent to the upper boundary of the upper boundary grid cell of the grid cell k, $\Delta x_{ke}$ represents a length of an adjacent grid cell on the right of the grid cell k in the x direction, $\vec{u_{ke}}$ represents a potential function degree of freedom vector of a grid cell adjacent to the right boundary of the grid cell k, $\vec{u_{kee}}$ represents a potential function degree of freedom vector of a grid cell adjacent to the right boundary of the right boundary grid cell of the grid cell k, $\vec{u_{kw}}$ represents a potential function degree of freedom vector of a grid cell adjacent to the left boundary of the grid cell k, and $\vec{u_{ke}}$ represents a potential function degree of freedom vector of a grid cell adjacent to the right boundary of the grid cell k.

Specific operations for solving potential degrees of freedom are as follows: Step 1: the potential degree of freedom of a boundary cell is assigned with a value, wherein if the boundary cell is not a main conductor boundary cell, the potential degrees of freedom on the boundary cell are all 0, and if the boundary cell is a main conductor boundary cell, the constant value of the potential degree of freedom of the boundary cell is assigned as 1, and the values of the potential degrees of freedom of other boundary cells are assigned as 0. Step 2: all right end terms of the linear system of equations to be solved are set as 0. Step 3: the numbers of cells to be solved are traversed from zero, the boundary of each grid cell k to be solved is determined to sequentially determine whether Kn, Knn, Ks, Ke, Kee and Kw cells are boundary cells, the modules I, II, III, IV, V and VI in the electrostatic field strength formulae are respectively processed in different ways according to the obtained boundary conditions (that is, whether the Kn, Knn, Ks, Ke, Kee and Kw cells are boundary cells), and equations obtained after processing are substituted into the linear system of equations shown in Formulae (1), (2) and (3) to finally obtain a linear system of equations in the form of $A*\vec{u}=\vec{b}$, that is, the present disclosure is based on discontinuous Galerkin finite element method, wherein A represents a sparse matrix with a huge order, and $\vec{u}$ represents a potential function degree of freedom vector composed of the potential degrees of freedom of all grid cells to be solved.

After $\vec{u}$ is solved, $\vec{p}$ and $\vec{q}$ can be obtained sequentially according to Formulae (2) and (3), so as to obtain the degree of freedom of the electric field strength function of each grid cell. However, due to the existence of boundary cells, it is still necessary to consider boundary conditions. After $\vec{p}$ and $\vec{q}$ are obtained, electric field intensities in the x direction and y direction of each grid cell are obtained.

Step 4: The Electric Charge of Each Conductor and the Coupling Capacitance of Each Conductor are Solved According to the Electric Field Strength of Each Grid Cell.

After the electric field strength of each grid cell is obtained, Gaussian integral of each conductor can be computed to obtain the electric charge of each conductor, thereby obtaining the capacitance of the main conductor and the coupling capacitance of each conductor. A specific solving method is as follows: since each rectangular grid cell is numbered before, all rectangular grid cells are traversed, all rectangular grid cells with the same number are regarded as the same conductor, the leftmost, rightmost, uppermost and lowermost boundaries of all rectangular grid cells are taken as four boundaries of the conductor, a grid cell set consisting of the grid cells enclosed by the four boundaries and the grid cells extending a grid from the four boundaries is taken as a Gaussian surface for solving the capacitance of the conductor, integration of the electric field strength function in the x-axis direction and integration of the electric field strength function in the y-axis direction are performed respectively on each grid cell in the grid cell set, integration of the electric field strength function in the x-axis direction is performed on each grid cell k on the Gaussian surface, and an integral form is as follows:

$$\pm \int_{K_{xw}}^{K_{xe}} \left[ \sum_{l=1}^{p} q_l * \varphi_l \left( \frac{x - K_{x0}}{\Delta x_k}, 0 \right) \right] dx,$$

wherein Kx0 represents an x coordinate of a midpoint of a grid cell k, Ky0 represents a y coordinate of the midpoint of the grid cell k, $\Delta x_k$ represents a length of the grid cell k in the x direction, $\Delta y_k$ represents a length of the grid cell k in the y direction, $K_{xw}$, $K_{xe}$ represent a left boundary and a right boundary of the grid cell k, and $q_l$ represents a degree of freedom of an electric field strength function in the y direction on the grid cell k.

Integration of the electric field strength function in the y-axis direction is performed on each grid cell k on the Gaussian surface, and an integral form is as follows:

$$\int_{K_{ys}}^{K_{yn}} \left[ \sum_{l=1}^{p} p_l * \varphi_l \left( 0, \frac{y - K_{y0}}{\Delta y_k} \right) \right] dy,$$

wherein $K_{ys}$, $K_{yn}$ represent a lower boundary and an upper boundary of a grid cell k, and $p_l$ represents a degree of freedom of an electric field strength function in the y direction on the grid cell k.

The integral value of the electric field strength function in the x-axis direction and the integral value of the electric field strength function in the y-axis direction of each grid cell k on the Gaussian surface are accumulated to obtain the quantity of electric charge of the conductor, and the capacitance of each conductor and the parasitic capacitance of interconnection lines between conductors are obtained according to the relationship between the quantity of electric charge and capacitance of the conductor.

The present disclosure tests the exact solution of the proposed algorithm and examples of error orders, and an example u=sin (x+y) is selected to test the accuracy of the first-order error and the second-order error with and without conductors. Finally, it is found that the errors of the results obtained by testing meet error requirements for theoretical computation. The test results of the accuracy of the second-order error with conductors are shown in Table 1. The test results of the accuracy of the second-order error without conductors are shown in Table 2. It can be seen that the discontinuous finite element algorithm of the present disclosure is reliable, and codes are correct.

TABLE 1

| Grid | Infinite order error | Convergence order |
| --- | --- | --- |
| 4*4 | 0.690632 | |
| 8*8 | 0.0493025 | 3.8082 |
| 16*16 | 0.00686255 | 2.8448 |
| 32*32 | 0.000934307 | 2.8768 |
| with conductor, accuracy = 2 | | |

TABLE 2

| Grid | Infinite order error | Convergence order |
| --- | --- | --- |
| 4*4 | 0.329522 | |
| 8*8 | 0.048871 | 2.7533 |
| 16*16 | 0.0065491 | 2.8996 |
| 32*32 | 0.000924688 | 2.82424 |
| without conductor, accuracy = 2 | | |

The verification results of the discontinuous finite element algorithm of the present disclosure on the extraction accuracy of parasitic capacitance between different numbers of conductors and the running time are as follows: for an example with 3 conductors, the error between the value of the parasitic capacitance extracted by the present disclosure and the standard reference value is 0.65%, and the running time is 0.16 s; for an example with 8 conductors, the error between the value of the parasitic capacitance extracted by the present disclosure and the standard reference value is 0.52%, and the running time is 0.52 s; for an example with 71 conductors, the error between the value of the parasitic capacitance extracted by the present disclosure and the standard reference value is 1.63%, and the running time is 2.3 s; and for an example with 97 conductors, the error between the value of the parasitic capacitance extracted by the present disclosure and the standard reference value is 2.40%, and the running time is 3.1 s. It can be seen that the smaller the number of conductors is, the smaller the error of the parasitic capacitance extracted by the present disclosure is. However, for a large number of conductors, the error of the parasitic capacitance extracted by the present disclosure is still small, which is controlled within 2.5%, and the running is very fast.

What is claimed is:

1. A method for extracting parasitic capacitance of interconnection lines of integrated circuits based on discontinuous finite element method, comprising:

dividing an integrated circuit layout into non-uniform grids according to a distribution situation of conductors to obtain a grid form that is uniform and dense close to boundaries of the conductors and is non-uniform and sparse away from the boundaries of the conductors;

determining whether each grid cell is a boundary cell, marking each grid cell with a global number, assigning grid cells which are non-boundary cells with numbers of cells to be solved, and establishing a mapping relationship between global numbers and the numbers of the cells to be solved, the grid cells which are non-boundary cells forming a region to be solved, and the boundary cells being grid cells outside the boundaries of the region to be solved and grid cells in a region where the conductors are located;

initializing freedom degrees of potentials of boundary cells, simplifying an electrostatic field strength formulae in a local discontinuous finite element format according to whether an adjacent grid cell of each grid cell in the region to be solved is a boundary cell to obtain a linear system of equations in the form of $A * \vec{u} = \vec{b}$, and solving the linear system of equations to obtain a freedom degree vector $\vec{u}$ of a potential function composed of the freedom degrees of potentials of all grid cells to be solved, A representing a sparse matrix, and $\vec{b}$ representing a constant vector generated in the process of simplifying the electrostatic field strength formulae in the local discontinuous finite element format;

solving a freedom degree vector of an electric field strength function composed of the freedom degrees of potentials of all grid cells to be solved according to the electrostatic field strength formulae in the local discontinuous finite element format and the freedom degree vector of potential function composed of the freedom degrees of potentials of all grid cells to be solved; and selecting a Gaussian surface according to the distribution situation of conductors, performing integration of an electric field strength function on the Gaussian surface to obtain the quantity of electric charge of the conductors, and obtaining capacitance of the conductors and the parasitic capacitance between interconnection lines of the conductors according to the relationship between the quantity of electric charge and capacitance of the conductors.

2. The method for extracting parasitic capacitance of interconnection lines of an integrated circuit based on discontinuous finite element method according to claim 1, wherein a specific method for dividing an integrated circuit layout into non-uniform grids according to the distribution situation of conductors comprises: dividing each conductor into at least one cuboid, reading row and column coordinates of each cuboid, uniformly extending an interval of a minimum mingap for a set number of times outward based on boundary rows of two adjacent conductors, gradually extending the interval with a gaptime multiple of mingap, and continuing to extend outward until the interval between the boundary rows of two adjacent conductors after extension is less than the interval after re-extension.

3. The method for extracting parasitic capacitance of interconnection lines of an integrated circuit based on discontinuous finite element method according to claim 1, wherein a specific method for initializing freedom degrees of potentials of boundary cells comprises:

when a boundary cell is not a main conductor boundary cell, assigning a constant value of the freedom degree of the potential of the boundary cell as 0; and when a boundary cell is a main conductor boundary cell, assigning a constant value of the freedom degree of the potential of the boundary cell as 1, and assigning constant values of the freedom degrees of potentials of other boundary cells as 0.

4. The method for extracting parasitic capacitance of interconnection lines of an integrated circuit based on discontinuous finite element method according to claim 1, wherein a specific method for simplifying an electrostatic field strength formulae in an local discontinuous finite element format according to whether an adjacent grid cell of each grid cell in the region to be solved is a boundary cell comprises:

dividing an electrostatic field formulae in the local discontinuous finite element format into six modules:

$$\int_{K_{xw}}^{K_{xe}} [\hat{q}_{K_{yn}}(x) * \varphi_{l_{K_{yn}}}^{-}(x)] dx, \qquad \text{module I:}$$

$$\int_{K_{xw}}^{K_{xe}} [-\hat{q}_{K_{ys}}(x) * \varphi_{l_{K_{ys}}}^{+}(x)] dx, \qquad \text{module II:}$$

$$-\int\int_{k} q(x, y) * \frac{\partial \varphi_l(x, y)}{\partial y} dk, \qquad \text{module III}$$

$$\int_{K_{ys}}^{K_{yn}} [\hat{p}_{K_{xe}}(y) * \varphi_{l_{K_{xe}}}^{-}(y)] dy, \qquad \text{module IV:}$$

$$\int_{K_{ys}}^{K_{yn}} [\hat{p}_{K_{xe}}(y) * \varphi_{l_{K_{xe}}}^{-}(y)] dy, \qquad \text{module V:}$$

$$-\int\int_{k} p(x, y) * \frac{\partial \varphi_l(x, y)}{\partial x} dk, \qquad \text{module VI}$$

wherein $K_{xw}$, $K_{xe}$ represent a left boundary and a right boundary of a grid cell k, $K_{ys}$, $K_{yn}$ represent a lower boundary and an upper boundary of the grid cell k, $\hat{q}_{K_{yn}}(x)$ represents a numerical flux of an electric field strength $q(x, -\frac{1}{2})$ at the lower boundary of the grid cell k, $q(x, -\frac{1}{2})$ represents an electric field strength at the lower boundary of the grid cell k, $\hat{q}_{K_{yn}}(x)$ represents a numerical flux of an electric field strength $q(x, \frac{1}{2})$ at the upper boundary of the grid cell k, $q(x, \frac{1}{2})$ represents an electric field strength at the upper boundary of the grid cell k, $\hat{p}_{K_{xw}}(y)$ represents a numerical flux of an electric field strength $p(-\frac{1}{2}, y)$ at the left boundary of the grid cell k, $p(-\frac{1}{2}, y)$ represents an electric field strength at the left boundary of the grid cell k, $\hat{p}_{K_{xe}}(y)$ represents a numerical flux of an electric field strength $p(\frac{1}{2}, y)$ at the right boundary of the grid cell k, $p(\frac{1}{2}, y)$ represents an electric field strength at the right boundary of the grid cell k, $\varphi_{l_{K_{yn}}}^{-}(x)$ represents a flux of a primary function $\varphi_l(x, \frac{1}{2})$ below the upper boundary of the grid cell k, $\varphi_l(x, \frac{1}{2})$ represents a value of the lth primary function of the grid cell k at the upper boundary, $\varphi_{l_{K_{ys}}}^{+}(x)$ represents a flux of a primary function $\varphi_l(x, -\frac{1}{2})$ above the lower boundary of the grid cell k, $\varphi_l(x, -\frac{1}{2})$ represents a value of the lth primary function of the grid cell k at the lower boundary, $\varphi_{l_{K_{xe}}}^{-}(y)$ represents a flux of a primary function $\varphi_l(\frac{1}{2}, y)$ on the left of the right boundary of the grid cell k, $\varphi_l(\frac{1}{2}, y)$ represents a value of the lth primary function of the grid cell k at the right boundary, $\varphi_{l_{K_{xw}}}^{+}(y)$ represents a flux of a primary function $\varphi_l(-\frac{1}{2}, y)$ on the right of the left boundary of the grid cell k, $\varphi_l(-\frac{1}{2}, y)$ represents a value of the lth primary function of the grid cell k at the left boundary, $p(x, y)$ represents an electric field strength function of the grid cell k in the x direction, $q(x, y)$ represents an electric field strength function of the grid cell k in the y direction, and $\varphi_l(x, y)$ represents the lth primary function of the grid cell k;

expressing a coefficient matrix of the six modules as operation results of addition, subtraction, multiplication and division of 11 matrices, the 11 matrices $C^{\varphi\varphi}$, $C^{\varphi\varphi x}$, $C^{\varphi\varphi y}$, $X_{nn}$, $X_{ns}$, $X_{sn}$, $X_{ss}$, $Y_{ee}$, $Y_{ew}$, $Y_{we}$ and $Y_{ww}$ are matrices representing the conversion relationship between a primary function on a reference grid cell and a primary function on each grid cell in the region to be solved, $$C^{\varphi\varphi}: C_{ij}^{\varphi\varphi} = \iint_{K_{base}} \dot{\varphi}_i(x,y)*\dot{\varphi}_j(x,y)dxdy,$$

$$C^{\varphi\varphi_x}: C_{ij}^{\varphi\varphi_x} = \iint_{K_{base}} \frac{\partial \dot{\varphi}_i(x, y)}{\partial x} * \dot{\varphi}_j(x, y)dxdy,$$

$$C^{\varphi\varphi_y}: C_{ij}^{\varphi\varphi_y} = \iint_{K_{base}} \frac{\partial \dot{\varphi}_i(x, y)}{\partial y} * \dot{\varphi}_j(x, y)dxdy,$$

$$X_{nn}: X_{nn}^{ij} = \int_{-1/2}^{1/2} \dot{\varphi}_j(x,-\tfrac{1}{2})*\dot{\varphi}_i(x,-\tfrac{1}{2})dx,$$

$$X_{ns}: X_{ns}^{ij} = \int_{-1/2}^{1/2} \dot{\varphi}_j(x,\tfrac{1}{2})*\dot{\varphi}_i(x,-\tfrac{1}{2})dx,$$

$$X_{sn}: X_{sn}^{ij} = \int_{-1/2}^{1/2} \dot{\varphi}_j(x,-\tfrac{1}{2})*\dot{\varphi}_i(x,\tfrac{1}{2})dx,$$

$$X_{ss}: X_{ss}^{ij} = \int_{-1/2}^{1/2} \dot{\varphi}_j(x,\tfrac{1}{2})*\dot{\varphi}_i(x,\tfrac{1}{2})dx,$$

$$Y_{ee}: Y_{ee}^{ij} = \int_{-1/2}^{1/2} \dot{\varphi}_j(-\tfrac{1}{2},y)*\dot{\varphi}_i(-\tfrac{1}{2},y)dy,$$

$$Y_{ew}: Y_{ew}^{ij} = \int_{-1/2}^{1/2} \dot{\varphi}_j(\tfrac{1}{2},y)*\dot{\varphi}_i(-\tfrac{1}{2},y)dy,$$

$$Y_{we}: Y_{we}^{ij} = \int_{-1/2}^{1/2} \dot{\varphi}_j(-\tfrac{1}{2},y)*\dot{\varphi}_i(\tfrac{1}{2},y)dy,$$

$$Y_{ww}: Y_{ww}^{ij} = \int_{-1/2}^{1/2} \dot{\varphi}_j(\tfrac{1}{2},y)*\dot{\varphi}_i(\tfrac{1}{2},y)dy,$$

wherein $C_{ij}^{\varphi\varphi}$ represents a projection of the ith primary function $\dot{\varphi}_i(x, y)$ of a reference grid cell $K_{base}$ on the jth primary function $\dot{\varphi}_j(x, y)$, $C_{ij}^{\varphi\varphi_x}$ represents a projection of a derivative in the x direction of the ith primary function of the reference grid cell $K_{base}$ on the jth primary function $\dot{\varphi}_j(x, y)$, $C_{ij}^{\varphi\varphi_y}$ represents a projection of a derivative in the y direction of the ith primary function of the reference grid cell $K_{base}$ on the jth primary function $\dot{\varphi}_j(x, y)$, $X_{nn}^{ij}$ represents a product of the value $\dot{\varphi}_j(x, -\tfrac{1}{2})$ of the jth primary function of the reference grid cell $K_{base}$ at the lower boundary and the value $\dot{\varphi}_i(x, -\tfrac{1}{2})$ of the ith primary function at the lower boundary, $X_{ns}^{ij}$ represents a product of the value $\dot{\varphi}_j(x, \tfrac{1}{2})$ of the jth primary function of the reference grid cell $K_{base}$ at the upper boundary and the value $\dot{\varphi}_i(x, -\tfrac{1}{2})$ of the ith primary function at the lower boundary, $X_{sn}^{ij}$ represents a product of the value $\dot{\varphi}_j(x, -\tfrac{1}{2})$ of the jth primary function of the reference grid cell $K_{base}$ at the lower boundary and the value $\dot{\varphi}_i(x, \tfrac{1}{2})$ of the ith primary function at the upper boundary, $X_{ss}^{ij}$ represents a product of the value $\dot{\varphi}_j(x, \tfrac{1}{2})$ of the jth primary function of the reference grid cell $K_{base}$ at the upper boundary and the value $\varphi_i(x, \tfrac{1}{2})$ of the ith primary function at the upper boundary, $Y_{ee}^{ij}$ represents a product of the value $\dot{\varphi}_j(-\tfrac{1}{2}, y)$ of the jth primary function of the reference grid cell $K_{base}$ at the left boundary and the value $\dot{\varphi}_i(-\tfrac{1}{2}, y)$ of the ith primary function at the left boundary, $Y_{ew}^{ij}$ represents a product of the value $\dot{\varphi}_j(\tfrac{1}{2}, y)$ of the jth primary function of the reference grid cell $K_{base}$ at the right boundary and the value $\dot{\varphi}_i(-\tfrac{1}{2}, y)$ of the ith primary function at the left boundary, $Y_{we}^{ij}$ represents a product of the value $$\dot{\varphi}_j\left(-\tfrac{1}{2}, y\right)$$

of the jth primary function of the reference grid cell $K_{base}$ at the left boundary and the value $\dot{\varphi}_i(\tfrac{1}{2}, y)$ of the ith primary function at the right boundary, and $Y_{ww}^{ij}$ represents a product of the value $$\dot{\varphi}_j\left(\tfrac{1}{2}, y\right)$$

of the jth primary function of the reference grid cell $K_{base}$ at the right boundary and the value $\dot{\varphi}_i(\tfrac{1}{2}, y)$ of the ith primary function at the right boundary; and traversing each grid cell in the region to be solved, simplifying the module I according to whether a grid cell adjacent to the upper boundary of the current grid cell and a grid cell adjacent to the upper boundary of an upper boundary grid cell are boundary cells, simplifying the module II according to whether a grid cell adjacent to the upper boundary of the current grid cell is a boundary cell, simplifying the module III according to whether a grid cell adjacent to the upper boundary of the current grid cell is a boundary cell, simplifying the module IV according to whether a grid cell adjacent to the right boundary of the current grid cell and a grid cell adjacent to the right boundary of a right boundary grid cell are boundary cells, simplifying the module V according to whether a grid cell adjacent to the right boundary of the current grid cell is a boundary cell, and simplifying the module VI according to whether a grid cell adjacent to the right boundary of the current grid cell is a boundary cell.

5. The method for extracting parasitic capacitance of interconnection lines of an integrated circuit based on discontinuous finite element method according to claim 4, wherein a specific method for simplifying the module I according to whether a grid cell adjacent to the upper boundary of the current grid cell and a grid cell adjacent to the upper boundary of an upper boundary grid cell are boundary cells comprises:

when the grid cell adjacent to the upper boundary of the current grid cell and the grid cell adjacent to the upper boundary of the upper boundary grid cell are both non-boundary cells, simplifying the module I as:

$$\left(\frac{\Delta x_k}{\Delta y_{kn}}*X_{ns}*(C^{\varphi\varphi})^{-1}*(X_{ss}-C^{\varphi\varphi_y})+\Delta x_k*X_{ns}\right)*\overrightarrow{u_{kn}}+$$

$$\left(-\frac{\Delta x_k}{\Delta y_{kn}}*X_{ns}*(C^{\varphi\varphi})^{-1}*X_{sn}-\Delta x_k*X_{ss}\right)*\overrightarrow{u_k};$$

when the grid cell adjacent to the upper boundary of the current grid cell is a non-boundary cell and the grid cell adjacent to the upper boundary of the upper boundary grid cell is a boundary cell is a boundary cell, simplifying the module I as:

$$\left(\frac{\Delta x_k}{\Delta y_{kn}}*X_{ns}*(C^{\varphi\varphi})^{-1}*X_{ns}\right)*\overrightarrow{u_{knn}}+$$

$$\left(-\frac{\Delta x_k}{\Delta y_{kn}}*X_{ns}*(C^{\varphi\varphi})^{-1}*C^{\varphi\varphi_y}+\Delta x_k*X_{ns}\right)*\overrightarrow{u_{kn}}+$$

$$\left(-\frac{\Delta x_k}{\Delta y_{kn}}*X_{ns}*(C^{\varphi\varphi})^{-1}*X_{sn}-\Delta x_k*X_{ss}\right)*\overrightarrow{u_k};$$

and when the grid cell adjacent to the upper boundary of the current grid cell is a boundary cell, simplifying the module I as:

$$\left(\frac{\Delta x_k}{\Delta y_k} * X_{ss} * (C^{\varphi\varphi})^{-1} * X_{ns} + \Delta x_k * X_{ns}\right) * \overrightarrow{u_{kn}} +$$

$$\left(-\frac{\Delta x_k}{\Delta y_k} * X_{ss} * (C^{\varphi\varphi})^{-1} * C^{\varphi\varphi y} - \Delta x_k * X_{ss}\right) * \overrightarrow{u_k} +$$

$$\left(-\frac{\Delta x_k}{\Delta y_k} * X_{ss} * (C^{\varphi\varphi})^{-1} * X_{sn}\right) * \overrightarrow{u_{ks}},$$

wherein $\Delta x_k$ represents a length of the grid cell k in the x direction, $\Delta y_k$ represents a length of the grid cell k in the y direction, $\Delta y_{kn}$ represents a length of an adjacent grid cell above the grid cell k in the y direction, $\overrightarrow{u_x}$ represents a freedom degree vector of a potential function of the grid cell k, $\overrightarrow{u_{kn}}$ represents a freedom degree vector of a potential function of a grid cell adjacent to the upper boundary of the grid cell k, $\overrightarrow{u_{ks}}$ represents a freedom degree vector of a potential function of a grid cell adjacent to the lower boundary of the grid cell k, and $\overrightarrow{u_{knn}}$ represents a freedom degree vector of a potential function of a grid cell adjacent to the upper boundary of the upper boundary grid cell of the grid cell k.

6. The method for extracting parasitic capacitance of interconnection lines of an integrated circuit based on discontinuous finite element method according to claim 5, wherein a specific method for simplifying the module II according to whether a grid cell adjacent to the upper boundary of the current grid cell is a boundary cell comprises:

when the grid cell adjacent to the upper boundary of the current grid cell is a non-boundary cell, simplifying the module II as:

$$\left(-\frac{\Delta x_k}{\Delta y_k} * X_{nn} * (C^{\varphi\varphi})^{-1} * (X_{ss} - C^{\varphi\varphi y}) - \Delta x_k * X_{nn}\right) * \overrightarrow{u_k} +$$

$$\left(\frac{\Delta x_k}{\Delta y_k} * X_{nn} * (C^{\varphi\varphi})^{-1} * X_{sn} + \Delta x_k * X_{sn}\right) * \overrightarrow{u_{ks}};$$

and when the grid cell adjacent to the upper boundary of the current grid cell is a boundary cell, simplifying the module II as:

$$\left(-\frac{\Delta x_k}{\Delta y_k} * X_{nn} * (C^{\varphi\varphi})^{-1} * X_{ns}\right) * \overrightarrow{u_{kn}} +$$

$$\left(\frac{\Delta x_k}{\Delta y_k} * X_{nn} * (C^{\varphi\varphi})^{-1} * X_{sn} + \Delta x_k * X_{sn}\right) * \overrightarrow{u_{ks}} +$$

$$\left(\frac{\Delta x_k}{\Delta y_k} * X_{nn} * (C^{\varphi\varphi})^{-1} * C^{\varphi\varphi y} - \Delta x_k * X_{nn}\right) * \overrightarrow{u_k}.$$

7. The method for extracting parasitic capacitance of interconnection lines of an integrated circuit based on discontinuous finite element method according to claim 6, wherein a specific method for simplifying the module III according to whether a grid cell adjacent to the upper boundary of the current grid cell is a boundary cell comprises:

when the grid cell adjacent to the upper boundary of the current grid cell is a non-boundary cell, simplifying the module III as:

$$\left(-\frac{\Delta x_k}{\Delta y_k} * C^{\varphi\varphi y} * (C^{\varphi\varphi})^{-1} * (X_{ss} - C^{\varphi\varphi y})\right) * \overrightarrow{u_k} +$$

$$\left(\frac{\Delta x_k}{\Delta y_k} * C^{\varphi\varphi y} * (C^{\varphi\varphi})^{-1} * X_{sn}\right) * \overrightarrow{u_{ks}};$$

and when the grid cell adjacent to the upper boundary of the current grid cell is a boundary cell, simplifying the module III as:

$$\left(-\frac{\Delta x_k}{\Delta y_k} * C^{\varphi\varphi y} * (C^{\varphi\varphi})^{-1} * X_{ns}\right) * \overrightarrow{u_{kn}} +$$

$$\left(\frac{\Delta x_k}{\Delta y_k} * C^{\varphi\varphi y} * (C^{\varphi\varphi})^{-1} * X_{sn}\right) * \overrightarrow{u_{ks}} + \left(\frac{\Delta x_k}{\Delta y_k} * C^{\varphi\varphi y} * (C^{\varphi\varphi})^{-1} * C^{\varphi\varphi y}\right) * \overrightarrow{u_k}.$$

8. The method for extracting parasitic capacitance of interconnection lines of an integrated circuit based on discontinuous finite element method according to claim 7, wherein a specific method for simplifying the module IV according to whether a grid cell adjacent to the right boundary of the current grid cell and a grid cell adjacent to the right boundary of a right boundary grid cell are boundary cells comprises:

when the grid cell adjacent to the right boundary of the current grid cell and the grid cell adjacent to the right boundary of the right boundary grid cell are both non-boundary cells, simplifying the module IV as:

$$\left(\frac{\Delta y_k}{\Delta x_{ke}} * Y_{ew} * (C^{\varphi\varphi})^{-1} * (Y_{ww} - C^{\varphi\varphi x}) + \Delta y_k * Y_{ew}\right) * \overrightarrow{u_{ke}} +$$

$$\left(-\frac{\Delta y_k}{\Delta x_{ke}} * Y_{ew} * (C^{\varphi\varphi})^{-1} * Y_{we} - \Delta y_k * Y_{ww}\right) * \overrightarrow{u_k};$$

when the grid cell adjacent to the right boundary of the current grid cell is a non-boundary cell and the grid cell adjacent to the right boundary of the right boundary grid cell is a boundary cell, simplifying the module IV as:

$$\left(\frac{\Delta y_k}{\Delta x_{ke}} * Y_{ew} * (C^{\varphi\varphi})^{-1} * Y_{ew}\right) * \overrightarrow{u_{kee}} +$$

$$\left(-\frac{\Delta y_k}{\Delta x_{ke}} * Y_{ew} * (C^{\varphi\varphi})^{-1} * C^{\varphi\varphi x} + \Delta y_k * Y_{ew}\right) * \overrightarrow{u_{ke}} +$$

$$\left(-\frac{\Delta y_k}{\Delta x_{ke}} * Y_{ew} * (C^{\varphi\varphi})^{-1} * Y_{we} - \Delta y_k * Y_{ww}\right) * \overrightarrow{u_k};$$

and when the grid cell adjacent to the right boundary of the current grid cell is a boundary cell, simplifying the module IV as:

$$\left(\frac{\Delta y_k}{\Delta x_k} * Y_{ww} * (C^{\varphi\varphi})^{-1} * Y_{ew} + \Delta y_k * Y_{ew}\right) * \overrightarrow{u_{ke}} +$$

$$\left(-\frac{\Delta y_k}{\Delta x_k} * Y_{ww} * (C^{\varphi\varphi})^{-1} * C^{\varphi\varphi x} - \Delta y_k * Y_{ww}\right) * \overrightarrow{u_k} +$$

-continued $$\left(-\frac{\Delta y_k}{\Delta x_k} * Y_{ww} * (C^{\varphi\varphi})^{-1} * Y_{we}\right) * \vec{u_{kw}},$$

wherein $\Delta x_{k_e}$ represents a length of an adjacent grid cell on the right of the grid cell k in the x direction, $\vec{u}_{k_e}$ represents a freedom degree vector of a potential function of a grid cell adjacent to the right boundary of the grid cell k, $\vec{u}_{k_{ee}}$ represents a freedom degree vector of a potential function of a grid cell adjacent to the right boundary of the right boundary grid cell of the grid cell k, and $\vec{u}_{k_w}$ represents a freedom degree vector of a potential function of a grid cell adjacent to the left boundary of the grid cell k.

9. The method for extracting parasitic capacitance of interconnection lines of an integrated circuit based on discontinuous finite element method according to claim 8, wherein a specific method for simplifying the module V according to whether a grid cell adjacent to the right boundary of the current grid cell is a boundary cell comprises:

when the grid cell adjacent to the right boundary of the current grid cell is a non-boundary cell, simplifying the module V as:

$$\left(-\frac{\Delta y_k}{\Delta x_k} * Y_{ee} * (C^{\varphi\varphi})^{-1} * (Y_{ww} - C^{\varphi\varphi_x}) - \Delta y_k * Y_{ee}\right) * \vec{u_k} +$$

$$\left(\frac{\Delta y_k}{\Delta x_k} * Y_{ee} * (C^{\varphi\varphi})^{-1} * Y_{we} + \Delta y_k * Y_{we}\right) * \vec{u_{kw}};$$

and when the grid cell adjacent to the right boundary of the current grid cell is a boundary cell, simplifying the module V as:

$$\left(-\frac{\Delta y_k}{\Delta x_k} * Y_{ee} * (C^{\varphi\varphi})^{-1} * Y_{ew}\right) * \vec{u_{ke}} +$$

$$\left(\frac{\Delta y_k}{\Delta x_k} * Y_{ee} * (C^{\varphi\varphi})^{-1} * Y_{we} + \Delta y_k * Y_{we}\right) * \vec{u_{kw}} +$$

$$\left(\frac{\Delta y_k}{\Delta x_k} * Y_{ee} * (C^{\varphi\varphi})^{-1} * C^{\varphi\varphi_x} - \Delta y_k * Y_{ee}\right) * \vec{u_k},$$

wherein $\vec{u}_{k_e}$ represents a freedom degree vector of a potential function of a grid cell adjacent to the right boundary of the grid cell k.

10. The method for extracting parasitic capacitance of interconnection lines of an integrated circuit based on discontinuous finite element method according to claim 9, wherein a specific method for simplifying the module VI according to whether a grid cell adjacent to the right boundary of the current grid cell is a boundary cell comprises:

when the grid cell adjacent to the right boundary of the current grid cell is a non-boundary cell, simplifying the module VI as:

$$\left(-\frac{\Delta y_k}{\Delta x_k} * C^{\varphi\varphi_x} * (C^{\varphi\varphi})^{-1} * (Y_{ww} - C^{\varphi\varphi_x})\right) * \vec{u_k} +$$

$$\left(\frac{\Delta y_k}{\Delta x_k} * C^{\varphi\varphi_x} * (C^{\varphi\varphi})^{-1} * Y_{we}\right) * \vec{u_{kw}};$$

and when the grid cell adjacent to the right boundary of the current grid cell is a boundary cell, simplifying the module VI as:

$$\left(-\frac{\Delta y_k}{\Delta x_k} * C^{\varphi\varphi_x} * (C^{\varphi\varphi})^{-1} * Y_{ew}\right) * \vec{u_{ke}} +$$

$$\left(\frac{\Delta y_k}{\Delta x_k} * C^{\varphi\varphi_x} * (C^{\varphi\varphi})^{-1} * Y_{we}\right) * \vec{u_{kw}} + \left(\frac{\Delta y_k}{\Delta x_k} * C^{\varphi\varphi_x} * (C^{\varphi\varphi})^{-1} * C^{\varphi\varphi_x}\right) * \vec{u_k}.$$

\* \* \* \* \*